US009933990B1

(12) United States Patent
Guterman et al.

(10) Patent No.: US 9,933,990 B1
(45) Date of Patent: Apr. 3, 2018

(54) TOPOLOGICAL MAPPING OF CONTROL PARAMETERS

(71) Applicant: Sonitum Inc., San Francisco, CA (US)

(72) Inventors: Lawrence Mark Guterman, Studio City, CA (US); Jonathan L. Lederman, Palo Alto, CA (US)

(73) Assignee: SONITUM INC., San Francisco, CA (US)

( * ) Notice: Subject to any disclaimer, the term of this patent is extended or adjusted under 35 U.S.C. 154(b) by 654 days.

(21) Appl. No.: 14/215,422

(22) Filed: Mar. 17, 2014

Related U.S. Application Data

(60) Provisional application No. 61/794,966, filed on Mar. 15, 2013.

(51) Int. Cl.
*G10L 21/10* (2013.01)
*G06F 3/16* (2006.01)
(Continued)

(52) U.S. Cl.
CPC ............ *G06F 3/165* (2013.01); *G06F 3/0488* (2013.01); *G06F 3/04847* (2013.01); *G10L 21/10* (2013.01)

(58) Field of Classification Search
USPC ........................................................ 704/276
See application file for complete search history.

(56) References Cited

U.S. PATENT DOCUMENTS 5,195,132 A   3/1993 Bowker et al.
5,388,185 A   2/1995 Terry et al.
(Continued)

FOREIGN PATENT DOCUMENTS

EP        2026550 A1    2/2009
WO    WO-03/027876 A1   4/2003
(Continued)

OTHER PUBLICATIONS

U.S. Appl. No. 13/837,205, filed Mar. 15, 2013, Dynamic Personalization of a Communication Session in Heterogeneous Environments, Lederman et al.
U.S. Appl. No. 14/213,584, filed Mar. 17, 2014, Universal Personalized Media, Guterman et al.
Anderson, S. and Kraus, N., "Neural Encoding of Speech and Music: Implications for Hearing Speech in Noise," Seminars in Hearing; 32(2):129-141; May 1, 2011.
(Continued)

*Primary Examiner* — Abul Azad
(74) *Attorney, Agent, or Firm* — Michael Best & Friedrich LLP

(57) ABSTRACT

Embodiments of the invention include methods, systems and computer program products for generating at least one control parameter for controlling a signal processor that processes audio signals. A point set is defined, wherein the point set may assume a plurality of topological configurations. Each topological configuration comprises at least one region, each of the at least one region associated with at least one or more topological attributes. A mapping is defined from each of the plurality of topological configurations to a respective plurality of parameters, wherein the mapping is performed based upon the topological attributes of said topological configuration. A user input is received wherein the user input expresses a transformation of the point set from a first topological configuration a second topological configuration. An updated set of topological attributes is determined based upon the second topological configuration. The one or more control parameters are updated based upon the second topological configuration using the mapping.

13 Claims, 10 Drawing Sheets

(51) Int. Cl.
*G06F 3/0484* (2013.01)
*G06F 3/0488* (2013.01)

(56) References Cited

U.S. PATENT DOCUMENTS

| | | | |
|---|---|---|---|
| 5,768,397 A | 6/1998 | Fazio | |
| 5,802,164 A | 9/1998 | Clancy et al. | |
| 5,943,413 A | 8/1999 | Ash et al. | |
| 6,043,825 A * | 3/2000 | Glenn | G06T 11/206 345/419 |
| 6,061,431 A | 5/2000 | Knappe et al. | |
| 6,122,500 A | 9/2000 | Dent et al. | |
| 6,144,670 A | 11/2000 | Sponaugle et al. | |
| 6,453,153 B1 | 9/2002 | Bowker et al. | |
| 6,453,284 B1 | 9/2002 | Paschall | |
| 6,711,258 B1 | 3/2004 | Sung | |
| 6,724,862 B1 | 4/2004 | Shaffer et al. | |
| 6,750,988 B1 | 6/2004 | Bossut et al. | |
| 6,813,490 B1 | 11/2004 | Lang et al. | |
| 6,993,119 B1 | 1/2006 | Zhang et al. | |
| 7,069,217 B2 * | 6/2006 | McLaughlin | G10L 13/07 704/266 |
| 7,177,417 B2 | 2/2007 | Michaelis | |
| 7,185,280 B2 | 2/2007 | Deganello et al. | |
| 7,529,545 B2 | 5/2009 | Rader et al. | |
| 8,225,207 B1 * | 7/2012 | Ramirez | G06F 3/04847 715/202 |
| 8,392,317 B2 | 3/2013 | Dayal et al. | |
| 8,526,591 B2 | 9/2013 | Morken et al. | |
| 8,634,531 B2 | 1/2014 | Morken et al. | |
| 8,670,771 B2 | 3/2014 | Brownworth et al. | |
| 8,718,682 B2 | 5/2014 | Brownworth | |
| 8,730,920 B2 | 5/2014 | Brownworth et al. | |
| 8,732,036 B2 | 5/2014 | Arya et al. | |
| 2004/0215448 A1 | 10/2004 | Funatsu et al. | |
| 2006/0079271 A1 | 4/2006 | Lee | |
| 2009/0190494 A1 * | 7/2009 | De Giovanni | H04L 45/02 370/254 |
| 2010/0262700 A1 | 10/2010 | Whynot et al. | |
| 2010/0290654 A1 * | 11/2010 | Wiggins | H04R 25/70 381/314 |
| 2011/0044473 A1 * | 2/2011 | Shon | H03G 5/165 381/104 |
| 2012/0296752 A1 | 11/2012 | Dayal et al. | |
| 2013/0155889 A1 | 6/2013 | Brownworth et al. | |
| 2013/0311545 A1 | 11/2013 | Wright et al. | |
| 2013/0337802 A1 | 12/2013 | Morken et al. | |
| 2014/0011538 A1 | 1/2014 | Mulcahy et al. | |
| 2014/0031003 A1 | 1/2014 | Shugart et al. | |
| 2014/0038617 A1 | 2/2014 | Mulcahy et al. | |
| 2014/0044125 A1 | 2/2014 | Rathnam et al. | |
| 2014/0105179 A1 | 4/2014 | Kashimba et al. | |
| 2014/0105181 A1 | 4/2014 | Milam et al. | |
| 2014/0149593 A1 | 5/2014 | Brownworth et al. | |

FOREIGN PATENT DOCUMENTS

| | | |
|---|---|---|
| WO | WO-2008/106036 A1 | 9/2008 |
| WO | WO-2009/046909 A1 | 4/2009 |

OTHER PUBLICATIONS

Beck, D.L. and Bellis, T.J., "(Central) Auditory Processing Disorders: Overview and Amplification Issues," News from Oticon Audiological Res Documentation; 4 pgs.; Dec. 2008.

Bellis, "Assessment & Management of Central Auditory Processing Disorders," Educational Setting From Science to Practice, 2nd Edition; 4 pgs.; Oct. 4, 2002.

Brockelmann, et al., "Emotion-Associated Tones Attract Enhanced Attention at Early Auditory Processing: Magnetoencephalographic Correlates," J Neuroscience; 31(21):14 pgs.; May 25, 2011.

International Search Report and Written Opinion of the ISA/RU in PCT/US2014/027968, 7 pgs.; dated Jul. 10, 2014.

Kalinli, O. and Narayanan, S., "Early Auditory Processing Inspired Features for Robust Automatic Speech Recognition," Speech Analysis and Interpretation Laboratory (SAIL) Dept. of Electrical Engineering-Systems, 5 pgs.; Sep. 2007.

Kim, "Signal Processing for Robust Speech Recognition Motivated by Auditory Processing," 208 pgs.; Dec. 2010.

Kim et al., "Binaural Sound Source Separation Motivated by Auditory Processing," Language Tech Inst and Dept. of Electrical and Computer Eng, Carnegie Mellon University; 4 pgs.; May 22-27, 2011.

King, S. and Hasegawa-Johnson, M., "Accurate Speech Segmentation by Mimicking Human Auditory Processing," Univ of Illinois Dept. of Electrical and Computer Eng; 5 pgs.; May 26-31, 2013.

Kraus, N. and Banai, K., "Auditory-Processing Malleability," Current Directions in Psychological Science; 16(2):105-110; Apr. 2007.

Kraus, N. and Chandrasekaran, B., "Music Training for the Development of Auditory Skills," Nature Rev Neuroscience; 11:599-605; Aug. 2010.

Laureys et al., "Auditory Processing in the Vegetative State," Brain; 123(8):1589-1601; Aug. 2000.

Musiek, "Auditory Memory Enhancement," 1 pg. (taken from "Habilitation and Management of Auditory Processing Disorders: Overview of Selected Procedures," J Am Acad Audiol; 10(6):329-342; Jun. 1999.

Oticon, Inc., "Pairing Guide," Oticon/Streamer, accessed on the internet at http://www.oticonusa.com/Oticon/Consumers/Products/ConnectLine/PairingGuide.html; 1 pg.; downloaded Mar. 11, 2013.

Pace, "Processing and Cognitive Enhancement," Listening Ears; accessed on the internet at http://www.listeningears.com/pace.html; 2 pgs.; downloaded Mar. 21, 2013.

Parbery-Clark et al., "Context-dependent Encoding in the Auditory Brainstem Subserves Enhanced Speech-in-noise Perception in Musicians," Neuropsychologia; 49(12):3338-3345; Oct. 2011.

So et al., "A New Algorithm for Explicit Adaptation of Time Delay," IEEE Transactions on Signal, Processing; 42(7):1816-1820; Jul. 1994.

Somerset Medical Center, "Auditory Processing Disorders," Somerset Health Connect; accessed on the internet at http://www.somersetmedicalcenter.com/Main/AuditoryProcessingDisorders.aspx; 3 pgs; downloaded Mar. 11, 2013.

Wikipedia, "Auditory Processing Disorder," Wikipedia; accessed on the internet at http://en.wikipedia.org/wiki/Auditory_processing_disorder; 10 pgs.; downloaded Mar. 21, 2013.

\* cited by examiner

TOPOLOGICAL MAPPING OF CONTROL PARAMETERS

PRIORITY

The present U.S. Utility Patent Application claims priority from U.S. Provisional Patent Application No. 61/794,966 filed on Mar. 15, 2013, entitled "Implicit Tuning User-Interface," which is incorporated by reference herein in its entirety.

TECHNICAL FIELD

The present invention relates to audio signal processing and more particularly to user interfaces for changing control parameters for signal processing.

BACKGROUND

Effective human computer interaction ("HCI") for the control of complex parameter spaces requires intuitive design that frees the user from an understanding of the technical aspects of the space. This is particularly important in non-linear spaces where superposition does not apply. For example, the human perceptual system is highly nonlinear in that the optimization of individual parameters does not necessarily generate an overall optimization for the superimposed state. Further, even in linear spaces, it is undesirable to require users to interact using interfaces that are technical in nature.

For example, in the case of audio, users may wish to control a complex set of parameters associated with a digital signal processor ("DSP"). The use of sound emitting devices, such as cellphones, digitalized music players, computer tablets, and the like, for the purpose of communication and/or media enjoyment, is ubiquitous. Being able to adapt the device to a person's unique listening preferences may play a significant role in the quality of the communication of the sound as well as its enjoyment. Equalizers are well established user-interfaces that allow users to adjust the gains, frequencies, and magnitudes for audio and sound emitting devices, using sliders, knobs or other graphical elements While experienced sound engineers and producers may be comfortable working with a physical or virtual mixing board exhibiting an array of sliders and knobs that may control such parameters as frequency gains and phases and temporal variables such as compression parameters, this type of interaction mechanism is neither effective nor attractive for most laypersons. Ideally a user could interact with a complex parameter space utilizing a friendly and intuitive interface that provided effective control of the parameter space without requiring any knowledge of the technical complexities of the space itself.

SUMMARY OF THE EMBODIMENTS

Embodiments of the invention include methods, systems and computer program products for generating at least one control parameter. The control parameter may be used for controlling a signal processor that processes audio signals. The audio signals may be representative of music, speech, recorded spoken words or electronically created words. In one embodiment, a point set is defined, wherein the point set may assume a plurality of topological configurations. Each topological configuration comprises at least one region, each of the at least one region associated with at least one or more topological attributes. A mapping is defined from each of the plurality of topological configurations to a respective plurality of parameters, wherein the mapping is performed based upon the topological attributes of said topological configuration. A user input is received wherein the user input expresses a transformation of the point set from a first topological configuration a second topological configuration. An updated set of topological attributes is determined based upon the second topological configuration. The one or more control parameters are updated based upon the second topological configuration using the mapping. The control parameters may be utilized to control a digital signal processor ("DSP").

In another embodiment of the invention, signal-processing parameters may be adapted using a graphical user interface by an end user. The end user will be presented with an audio signal and can then augment the audio signal by graphically manipulating a representation of the audio signal. The audio signal may be a test audio signal. The test audio signal may be a pre-recorded sequence of sounds, such as spoken words or may be an electronically generated sequence. In other embodiments, the graphical user interface provides a mechanism for altering audio signals received in real-time (for example, during a telephone call or streamed media). For each word in the audio signal containing a plurality of words with each word comprising at least one phoneme, a respective frequency for each phoneme is associated. The association may be in the form of a file that includes data representative of the audio signal and also associated frequencies for the phonemes. In other embodiments, the association may be the result of performing signal processing on the audio signal to determine the phonemes and words within the audio signal and then determining a frequency for each of the phonemes using signal-processing techniques. One of the words is then graphically displayed on a display device with a curve that may be adjacent to the word (e.g. above, below, left of, right of, or through the graphically displayed word). The curve exhibits a curvature as a function of position. User input may be received by a processor associated with the display device displaying the word and the curve and the user input may indicate a change to the curvature of the curve. The curve is then updated and displayed on the display device with the updated curvature. The processor then uses the updated curvature to determine at least one of an attack and a release time parameter based at least in part on the curvature.

The determined parameter (e.g. attack time, release time) is then provided to the signal processor for processing of audio signals.

In one embodiment, a slope is determined based upon the curvature and the determined slope is used at least in part for determining a control parameter (e.g. release, attack time etc.). It should be recognized that the curve may have a number of different slopes and that different parameters may be associated with the different slopes or different values may be associated with the different slopes for a single parameter.

In other embodiments of the invention a coordinate system, such as a Cartesian coordinate system is displayed as a graphical user interface on a display device. A curve is displayed within the coordinate system, wherein the curve is representative of one or more phonemes within a word or phrase of an audio signal. In one embodiment, the input volume is provided on a first axis of the coordinate system and the output volume is provided on a second axis of the coordinate system. The input and output volumes are representative of displayed phonemes for a word or phrase. A user may interact with the graphical user interface to change the output volume position defining a threshold output volume and thus, compression may be applied to the output signal if the output signal is above the defined threshold. The user may also define a desired kneepoint associated with a position within the coordinate system. The threshold and kneepoint parameters may be provided to the signal processor for processing of audio signals.

In other embodiments, a "bender" may be displayed on the graphical user interface that extends beyond the x-y position of the kneepoint of the curve. The bender extends the curve itself in the form of a line or another predefined curve shape defined by a function. A user may indicate the desired angle or slope of the bender and in response to the user's changes to the graphical representation of the curve, a ratio parameter may be determined. For example, the ratio parameter may be based upon the desired angle or slope of the bender. The ratio parameter may then be passed as a control parameter to the signal processor for processing audio signals.

In yet another embodiment of the invention, a word from an audio signal is graphically displayed wherein the word contains at least one phoneme and the word exhibits a size (e.g. width) and height that is function of parameters of the audio signal. A different size and height may be associated with each phoneme or letter within the word. A user may then adapt the graphical interface by increasing or decreasing the size and height of the letters/phonemes through graphical manipulation. The word is displayed with the graphical manipulations and one or more parameters are determined based upon the manipulation of the size and/or height of each phoneme of the word. The parameter may be an equalization gain parameter for the phoneme.

BRIEF DESCRIPTION OF THE DRAWINGS

The foregoing features of embodiments will be more readily understood by reference to the following detailed description, taken with reference to the accompanying drawings, in which.

DETAILED DESCRIPTION

According to an embodiment, a parameter set is controlled via user interaction with a point set displayed in a graphical environment. The point set may assume any number of topological configuration based upon human interaction with a GUI. Each topological configuration is further associated with a plurality of regions and each region is associated with a plurality of attributes. Attributes may comprise, for example, geometric attributes such as curvature, slope area, length or any other measurable attribute. A metric space may be imposed on the topological space such that a measure of point nearness may be determined based upon a particular topological configuration.

Figure 1A:
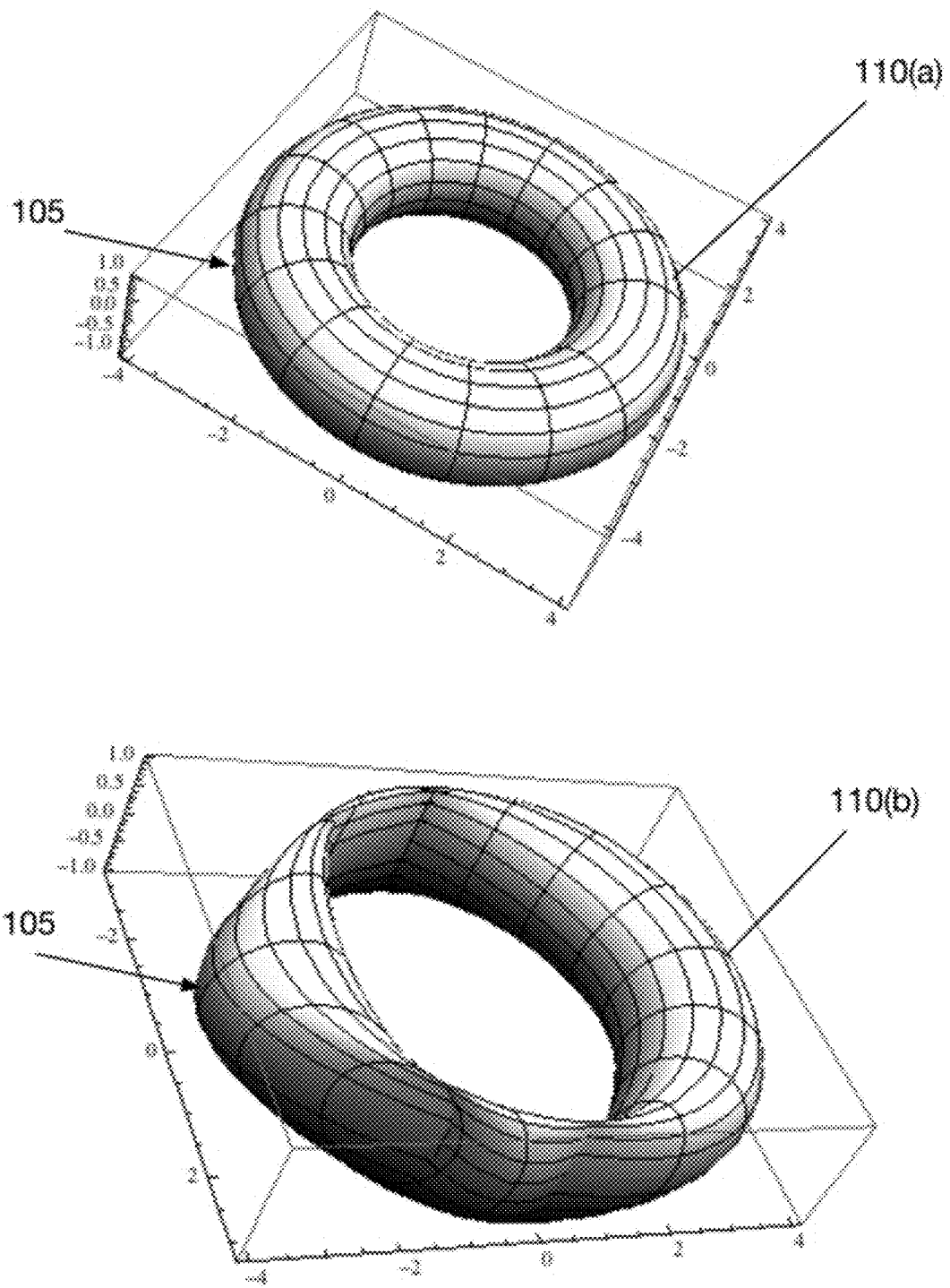
FIG. 1A illustrates an exemplary transformation of a point set from a first topological configuration into a second topological configuration.

For example, FIG. 1A illustrates an exemplary transformation of a point set from a first topological configuration 110(a) into a second topological configuration 110(b). According to this illustrative embodiment, first topological configuration 110(a) comprises a perfect torus, and second topological configuration 110(b) a deformed torus. A mesh or other grid may be projected onto the respective configurations as shown in FIG. 1A to define a plurality of local regions, e.g., 105, wherein each local region is imbued with a plurality of topological or geometrical attributes, which may be calculated based upon a particular topological configuration.

Topological attributes may comprise curvature, differential geometric parameters, length, distance, area or any other metric. According to one embodiment, topological configurations 110(a)-110(b) may be topological manifolds and in particular differential manifolds with a global differential Euclidean structure. Topological attributes may be expressed as numerical values indicating the exemplary described attributes.

Figure 1B:
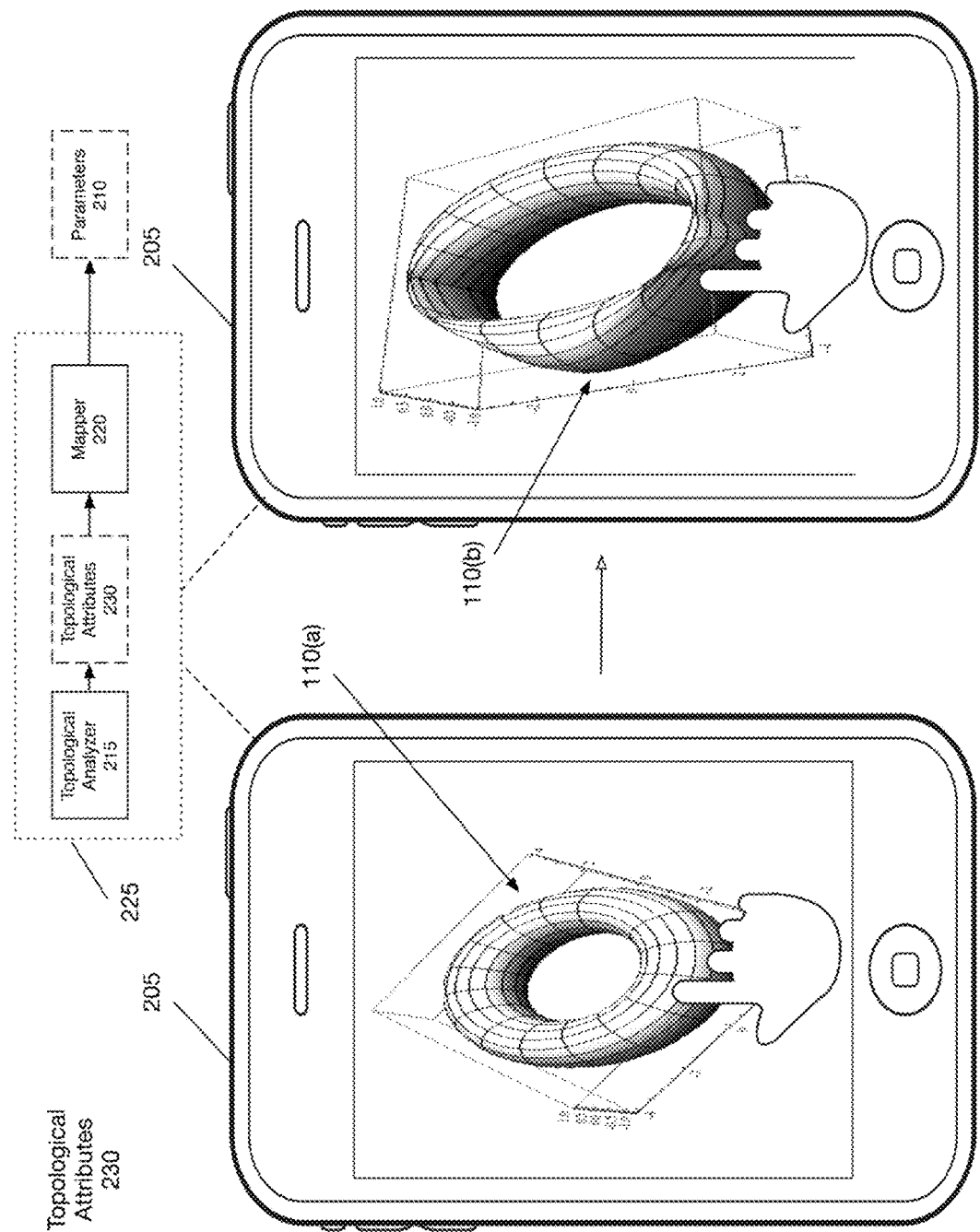
FIG. 1B depicts a user interaction with a topological configuration according to one embodiment.

FIG. 1B depicts a user interaction with a topological configuration according to one embodiment. A graphical representation of topological configurations, e.g., 110(a)-110(b) may be displayed on device 205 capable of displaying graphics and equipped with a processor. Device 205 may also receive human input via a HCI such as a touch screen, mouse, pen or the like. For example, device 205 may be a smartphone such as an IPhone or Android device. Continuing with this example, via human touch input, topological configuration 110(a) may be transformed to topological configuration 110(b) via a myriad of control inputs or gestures such as pinching, dragging, swiping, etc.

Device 205 may also execute a topological mapping process 225 comprising topological analyzer 215 and mapper 220, which generates parameters 210. As described in detail below, topological analyzer may analyze regions of a particular topological configuration to extract various topological attributes as described above. Topological attributes 230 may then be provided to mapper 220, which generates parameters 210. As described below, parameters 210 may then be utilized to control a signal processor or other processor in real time. The controlled signal processor may be remote or local to device 205.

Figure 1C:
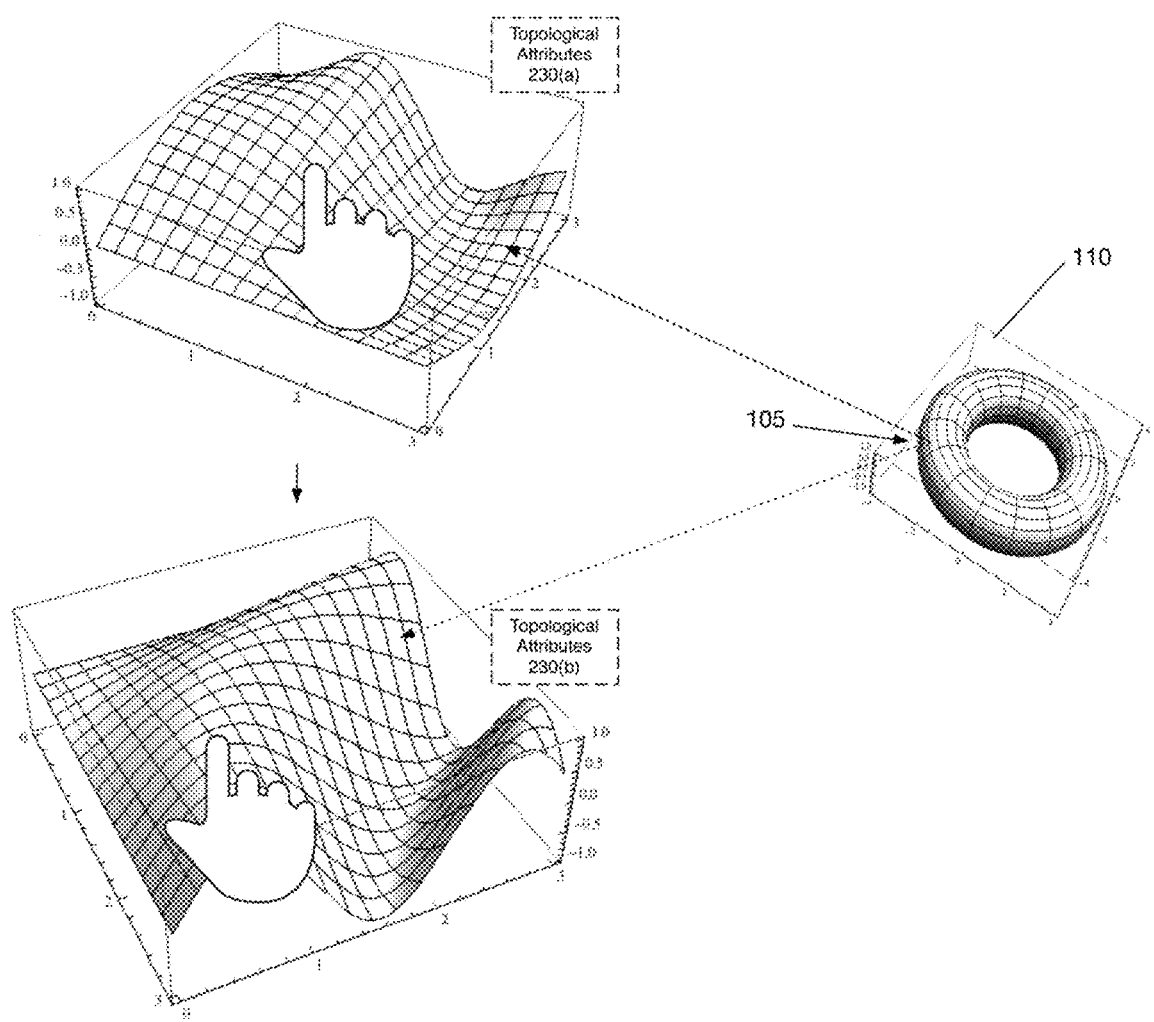
FIG. 1C depicts an exemplary transformation of a region comprising a portion of a topological configuration, which may be achieved via touch input.

FIG. 1C depicts an exemplary transformation of a region 105 comprising a portion of a topological configuration 110, which may be achieved via touch input. As shown in FIG. 1C, region 105 initially exhibits topological attributes 230

(a), whereupon after user input (e.g., touch input), region 105 exhibits topological attributes 230(b).

Figure 1D:
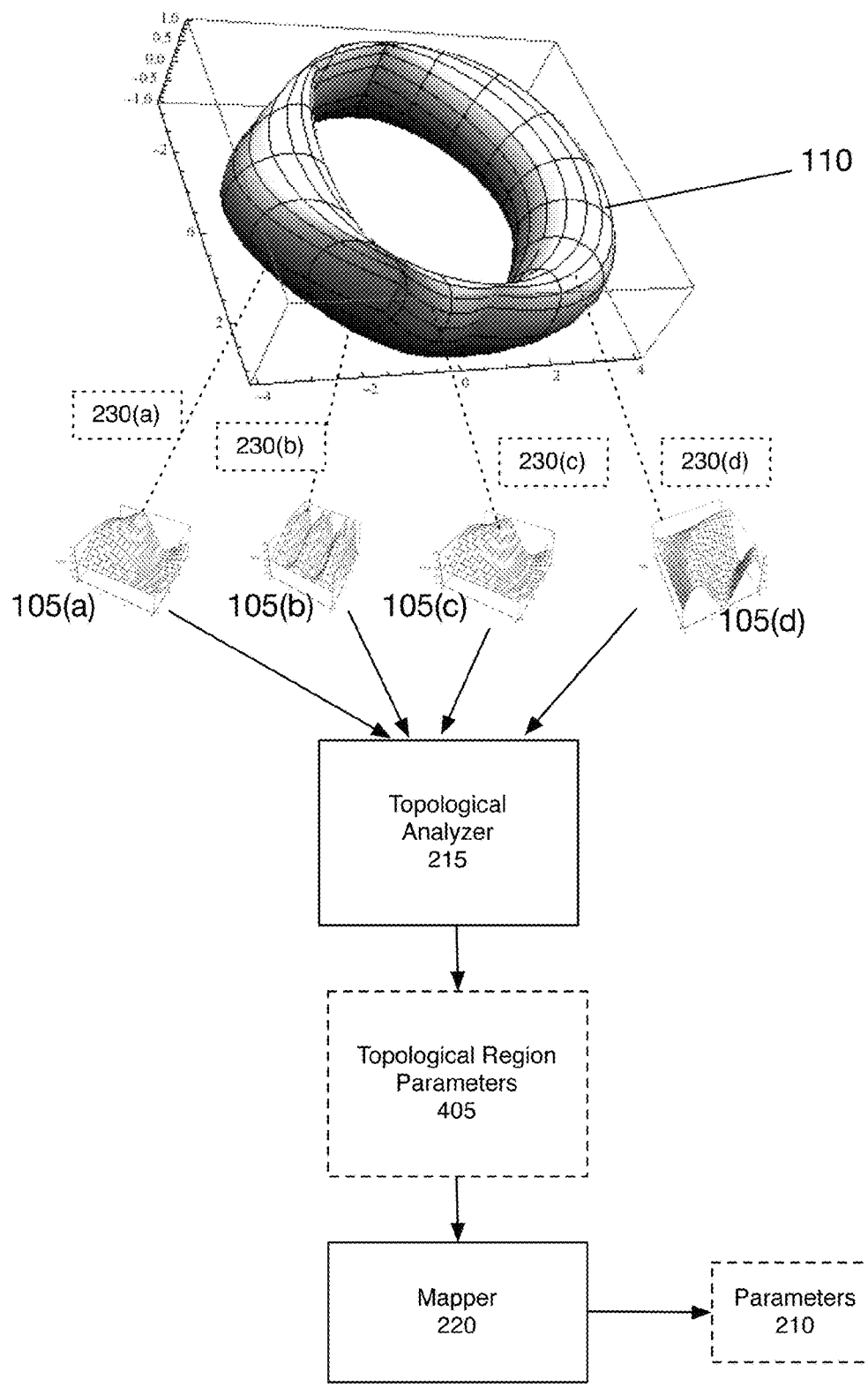
FIG. 1D depicts an operation of a topological mapping process according to one embodiment.

FIG. 1D depicts an operation of a topological mapping process according to one embodiment. A desired topological configuration 110 to be parameterized is provided to topological analyzer 215. In particular, topological analyzer 215 computes respective topological attributes, e.g., 230(a)-230(d) for respective regions 105(a)-105(d) using any known numerical techniques including differential geometric analysis, etc. to generate topological region parameters $\vec{r}$. Topological region parameters $\vec{r}$ are then provided to mapper 220, which may perform a non-linear or linear map of topological region parameters $\vec{r}$ to parameters 210. Parameters 210 may be used to control a process signal as a signal transformation process.

In particular, $$p_i m_i(\vec{r}_1, \vec{r}_2, \ldots \vec{r}_N)$$

If $m_i$ are linear maps, the output parameters may be expressed as a matrix equation:

$$\vec{p} = M\vec{r}$$

where $\vec{p}$ is a column vector of parameters, $\vec{r}$ a column vector of region parameters and M a transformation matrix.

According to one embodiment, topological mapping of control parameters may be effectively applied in providing a tuning interface for audio signal processing parameters. According to one embodiment, a tuning interface utilizing a topological map may be implemented for deployment on a mobile device such as a smartphone for tuning a signal processor running on the device or on a remote network node.

The tuning of audio and signal processing parameters other than equalizer parameters has not gained widespread use among laypeople such as general users of sound emitting devices. While laypeople may desire to adapt an audio device to better suit their hearing, most generally are disinclined do to so due to the learning hurdle associated with tuning beyond simple adjustments with an equalizer, and even tuning a conventional equalizer can often be too challenging or baffling.

Similarly, hearing impaired individuals, though they may have a greater interest in tuning and adapting audio and sound emitting devices to compensate for their impairment, often face the same hurdles in being able to tune beyond simple adjustments with an equalizer. Moreover, they too may also find tuning a conventional equalizer too daunting or time-consuming and difficult to learn.

According to an embodiment, a method for tuning a plurality of signal processing parameters associated with speech processing is achieved using a topological map from a topological configuration to a set of signal processing parameters for controlling speech signal processing. An interactive, user-friendly graphical interface may be achieved insofar as technical audio engineering jargon and complex DSP parameters and algorithms are mapped to control gestures expressed on a topological line, surface or other object, which is displayed and interacted with via a GUI. Likewise, the embodiment may be employed by laypersons and hearing-impaired individuals alike in tuning everyday audio and sound emitting devices (such as for enjoyment or for preference).

Insofar as the control of complex highly technical signal processing parameters is re-expressed as a user interaction with a topological object assuming a plurality of adjustable forms, an implicit tuning interface for tuning of DSP parameters is realized. That is, a user of a tuning GUI utilizing an underlying topological map is freed from the requirement of developing a deep understanding of the technical aspects of the signal processing parameters associated with the media to be tuned and may interact with the GUI in an intuitive manner. Tuning optimization may be thus achieved in an implicit fashion.

Among the many possible characteristics, the various embodiments may be employed to adjust:
  Gain;
  Equalization (gain per frequency band);
  Compression (including threshold settings);
  Wide dynamic range compression (which may include volume level threshold adjustments as a function of both input volume and frequency, as well as adjustments to attack and release times typically associated with fast, dynamically changing compression on the order of milliseconds, that is to say, on the order of phonemes and syllables in speech);
  Frequency compression (also referred to as frequency transposition); and
  Processing (such as equalization) done in the frequency domain after the input signal has been transformed into that domain;
  Various others (in addition to attack and release time settings, such as additional compressions settings including, but not limited to, ratio, kneedepth, automatic gain control, etc).

According to an illustrative embodiment, an implicit user-interface for tuning audio waveforms, DSP parameters, and complex signal processing algorithms is achieved. The illustrative embodiment may be used to enhance entertainment as well as improve speech and audio intelligibility.

Figure 1E:
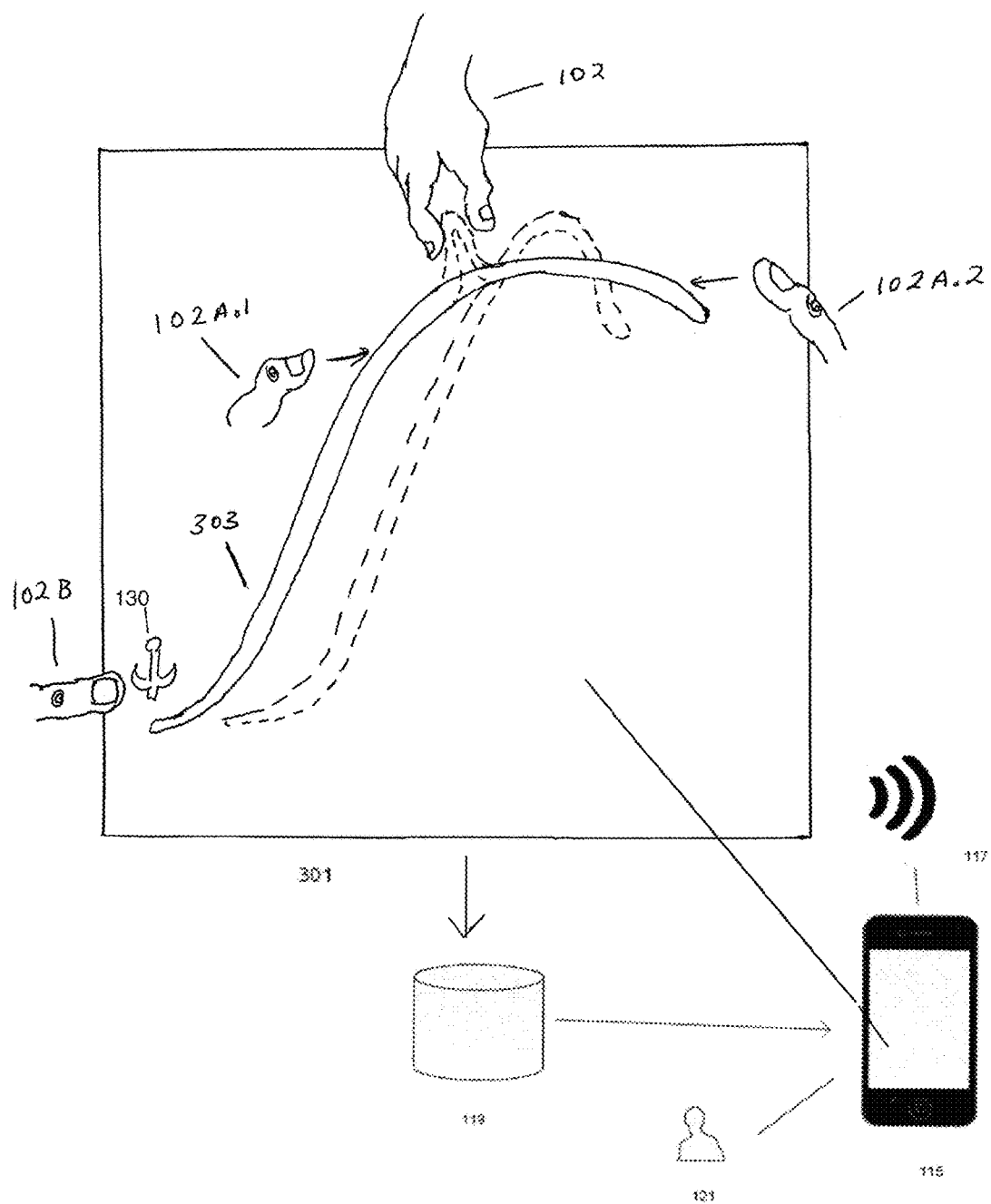
FIG. 1E illustrates an embodiment of the invention including an interactive graphical user interface of an electronic sound-emitting device.

As illustrated in FIG. 1E, an interactive graphical user interface 301 of an electronic sound-emitting device is provided to a user 121. The interface may be for a smartphone 115. The interactive graphical user interface may show a user adjustable curved line 303. The curved line 303 may be mapped to an equalizing function tied to the signal processing parameters 119 utilized to process speech or other sound presented to the user.

In an embodiment, the user may be presented with a recording 117, such as some form of spoken language or other sound, played according to default signal processing parameters. The illustrative embodiment allows the user to make adjustments with his fingers 102 to the curved line 303. The changes may be mapped to changes in, for example, gains in a particular frequency range, as employed in sound equalization corresponding to speech processing parameters. The parameters may be part of the signal processing system of the device to process speech or other sound presented to the user.

Figure 5:
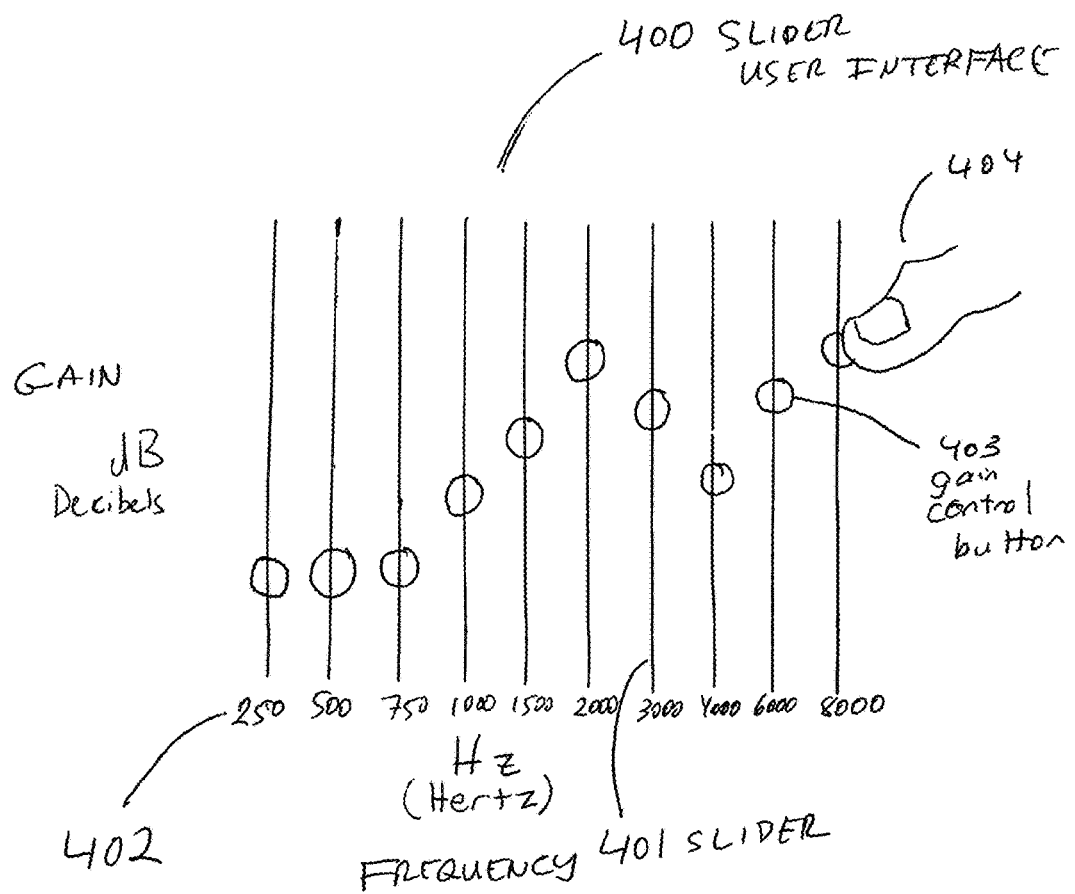
FIG. 5 illustrates a typical prior art equalizer displayed on an "x-y" axis having a plurality of sliders.

As illustrated in FIG. 5, parameters in a typical equalizer are normally displayed on an "x-y" axis, using a slider user interface 400, with frequency in hertz running along the x-axis and gain in decibels running along the y-axis. Each discrete frequency, or frequency band, is associated with a vertical slider 401. A typical display may feature 6, 8, 10 or some other number of sliders corresponding to each frequency band. Frequency bands for human hearing used in a typical display may range from 250 Hz (hertz) to 8000 Hz, or more, increasing every octave or half-octave, or a combination thereof, or at some other increment. For example, a display may feature the following row of frequencies or frequency bands 402: 250 Hz, 500 Hz, 750 Hz, 1000 Hz, 1500 Hz, 2000 Hz, 3000 Hz, 4000 Hz, 6000 Hz, and 8000 Hz. Typical gain settings run from 0 (zero gain) at the bottom of the bank of sliders, to 100 decibels (or some other maximum value) at the top of the sliders. Typically, the parameters input to the equalizer via the equalizer user interface include the frequency band measured in hertz, and the gain for a given frequency band, measured in decibels. In a typical interface, the user would use his or her finger(s) 404 to slide each gain control button 403 associated with each frequency to a specific setting or decibel level in order to tailor the frequency response of the overall signal to the user's hearing preferences.

According to the embodiment, the user may hear the changes in sound that resulted from the shifts in the signal processing parameters 119 (FIG. 1E) by replaying the sound. The user may, through a trial and error approach, adjust the position and shape of the curve 303 while listening to the recording 117 (e.g., spoken language or other sound) that may be processed according to the newly adjusted speech processing parameters 119. Note that the embodiment illustrated in FIG. 1E does not display parameters, units, scale, axis labels, nor any other information regarding the dsp parameters being mapped to. In fact, the scale of the illustration in FIG. 1E, in either dimension, may not be a one-to-one, or even linear, correlation to the scale of the typical equalizer display.

In one embodiment, for example, the controls on the user interface 301 may include a Global control Regional controls, and Local controls. A Global control may be configured to allow the user to slide the entire graphical object (i.e., the curved line 303) along the horizontal and vertical axes of the graphical interface without changing its overall shape. The Global control itself may for example be manipulated by user's finger or thumb 102B touching and moving an "anchorpoint" button 130. The curved line 303 may be mapped to signal processing parameters representing frequency in hertz along the horizontal axis and gain in decibels along the vertical axis. As such, the higher frequencies may be located to the right on the horizontal axis, and the higher gain may be located towards the top of the vertical axis.

The embodiment may be configured to allow the user to slide the entire curved line 303 slightly to the right (without changing its shape), for example, using the Global control. This motion or gesture input may be mapped to the updated signal processing parameters 119 such that the updated signal processing parameter 119 may reduce the gain in the lower frequencies because the exemplary curved line 303 has the shape of a rising slope towards the right. The embodiment may result in the user experiencing less boost, or gain, in volume for lower frequencies once these adjustments have been implemented when presented with sound processed in this way. It may occur that the user will obtain improved speech discrimination, for example, by this reduction of gain in the lower frequencies. The user may use the Global control iteratively, sliding the curve repeatedly while listening to the re-processed sound with each iteration. The user may engage in this "feedback loop" action or activity in order to hone in on ever more improved audio for his or her hearing, without having to know anything about equalizers or the underlying digital signal processing parameters such as frequency, gain or magnitude. That is to say, the sliding motions or gestures using the Global control may ultimately map to a decibel level associated with each frequency or frequency band in much the same way as is illustrated in the standard equalizer slider bank of FIG. 5 without the user having to understand anything about the parameters associated with equalization such as gain in decibel units and frequency in hertz, parameters which are featured prominently and labeled on the conventional equalizer graphical user interface, but not on the exemplary embodiment illustrated in FIG. 1E.

In another aspect of the embodiment, Regional controls may be provided to the user. That is, the embodiment may be configured to allow the user to squeeze or stretch a "region" of the curve 303 with fingers/thumbs 102A.1 and 102A.2, using the Regional controls. The term "region" in this example refers to a partial section of the curve that is smaller than the whole curve but not more than an "order of magnitude" smaller. That is to say, loosely in the range of approximately one-fifth the width to two-thirds the width of the curve (though it could narrower or wider). The reason for this choice is that hearing profiles (typically displayed on an audiogram) among the hearing impaired typically have a topology consisting of a single or at most a double "crest" or "trough", with exemplary categorizations by the audiology profession such as "high frequency steeply sloping hearing loss" or "shallow sloping loss." Most forms of hearing loss, especially adult onset sensorineural loss, are characterized by a smooth changing and continuous function or curve as typically seen on the frequency response curve of an audiogram. Noise induced loss, (such as loss caused by a gunshot or explosion) may reveal a sudden instant loss (and thus a steep, non-continuous drop) above certain frequencies, but since approximately 80% of hearing losses involve gradual age-related sensorineural loss, it is a reasonable general approach, for the majority of hearing impaired users, to consider a more smoothly changing function. Therefore, the "regions" of loss typically involve local maxima or minima whose spread is greater than one order of magnitude of the width of the human audible speech spectrum (approximately 250 Hz to 8000 Hz). In this embodiment, fingers/thumbs 102A.1 and 102A.2 may squeeze a region of the curve's width, for example, a "crest" or "trough" such that, in the case of the crest, the sloping portions on either side are squeezed and the top of the crest itself is raised as a result. In this exemplary embodiment, the user would quickly achieve an effect that would map to parameters that would generate a resultant sound that is more "pinched" sounding and possibly "sharper" or more "clear"-sounding. This is because increasing gains in higher frequency regions of speech (2 Khz to 6 Khz) causes the loudness level of some consonants and sibilants (such as phonemes including s's, sh's, th's and f') to increase. It is well known among audiology professionals that speech discrimination and understanding in English is directly correlated to the ability to hear and perceive sibilants and some consonants such as the aforementioned ones. Thus, a user may iteratively adjust Regional controls while evaluating changes to his or her ability to hear and understand audio projected from the sound-emitting device, and thus increase his or her level of hearing enhancement. A user may also iteratively adjust Regional controls in combination with or "on top of" adjusting the Global control, and thereby refine the quality of the result of the Global control, since the Regional control allows for more precise adjustment than the gross movement generated by employing the Global control only.

In another aspect of the embodiment, the Local control may be provided and configured to allow a "pinching" and pulling motion or gesture. In this aspect of the embodiment, the user may tap on a "point" on the curve using a digit on hand 102 in order to initiate the ability to make an interactive "pinch" and pull motion that results in local changes to the curves. Local changes such as these would be confined to a very narrow width—typically less than an order of magnitude the width of curve 303. As such, the narrow area on either side of the pinched or pull section of the curve may be altered without affecting the neighboring region of the curve, which is one way in which this aspect of the embodiment may be distinguished from the Regional controls, which typically do affect the neighboring regions of the curve. This interactive pinching and pulling motion may be described in the field computer graphics as "pulling points." The input may provide a tighter degree of control compared to the Global control and the Regional controls.

When employed with the mapping scenario described above (e.g., frequency along the horizontal axis and gain along the vertical axis), the gesture may be mapped to DSP parameters representing gain levels at individual frequencies (or frequency bands, depending on the granularity and resolution of the underlying equalization algorithm). The local control may have "looseness" and "tightness" variables, which may allow the user to "pull" sections of the curve more tightly. Accordingly, little or no disturbance may occur to the surrounding parts of the curve using the "tighter" setting, whereas use of the "looser" setting may trigger a greater disturbance to the surrounding parts of the curve. Tightness and looseness variables might be implemented with the use of, for example, spline-based curves. Thus, a user may employ this third "tier" of control alone or in combination with Regional controls and/or the Global control to further refine the accuracy of audio enhancement.

It is this method of "tiered" controls as a user interface that distinguishes it from conventional equalizer interfaces. For example, a user may start with the "big picture", employing a gross Global control motion in order to achieve a "ballpark" approximation of the user's tuning preferences. Then the user may employ Regional controls to hone in more accurately on the user's tuning preferences. Finally, the user may employ local controls as an additional layer of tuning in order to fine tune individual frequencies or frequency bands and thus arrive at an even more accurate result that, in combination with the Global and Regional controls, is tuned more precisely for the user's preferences. The structure and functionality associated with this tiered, implicit tuning is different from the structure and functionality of conventional equalizer tuning because in the case of the conventional equalizer, there are no layers—arriving at a precise tuning must all occur at a single level of functionality.

It should be appreciated that the illustrative embodiment is merely for illustration and is not intended to limit the application of this function. Of course, other methods of representing the equalization algorithm may be employed without departing from the various described embodiment.

Audiologists and, in particular, hearing aid engineers may utilize attack and release time parameter settings as one of the tools in speech processing to help improve speech and audio intelligibility. The attack and release time components of a Wide Dynamic Range Compression (WDRC) algorithm are integral to fine tuning the cascade of phonemes or linguistic elements (such as vowels, consonants, sibilants, plosives, fricatives, etc.) that comprise speech to allow for better speech discrimination in the hearing impaired, and to allow for reduction or removal of discomfort felt by the user at certain frequencies. Despite this, hearing aid manufacturers often do not provide access to audiologists to alter attack and release time parameters in hearing aids, and instead those settings are often set by hearing aid engineers, although of course there are audiologists familiar with this tool. Giving the user the ability to control these parameters, even implicitly, gives the user great power to fine-tune the user's audio enhancement on sound-emitting devices and improve speech discrimination for the hearing impaired. Attack and release time algorithms involve assigning various levels of aggressive versus loose managing or "riding" of the volume swings in audio (speech, music, or any other sound) associated with compression, and they are applied at the time scale of the spoken phoneme, which is on the order of milliseconds. That is, attack and release times have to do with the speed at which the compressor reacts to compress or "limit" a potentially too-loud incoming audio signal, as well as with the decay time it employs to allow the compressed signal to taper off (The release time is sometimes referred to as the "decay" time). If the incoming audio signal of a phoneme associated with a certain frequency or frequency range is too loud, the user may experience pain or discomfort. Hearing aid users, for example, have typically been known to remove their hearing aids in reaction to such an event and may be reluctant to wear them altogether if the problem is not corrected. While the discomfort or pain problem may be partially corrected by adjusting the compression threshold parameter, speech discrimination may be lost as a result. Attack and release time controls, on the other hand, may allow a user to both mitigate or eliminate pain or discomfort, while at the same time maintaining and/or enhancing speech discrimination. In practice, the conceptual understanding of the function of the algorithm and its associated parameters on the part of the user is likely to be limited. The illustrative embodiment allows the user to adjust the attack and release time components without understanding the underlying technical information. The user interacts with a symbolic display, for example, in this embodiment, a word, phrase, or linguistic element, which has meaning to the user. The user adjusts the graphical interface according to his or her understanding of the symbolic display itself. The symbolic display is then mapped to actual attack and release time parameters, which may have no meaning to the user. The user has no need to understand anything about the attack and release time parameters or the underlying algorithm. Nonetheless, the resultant processed audio may be identical using the symbolic, implicit tuning interface as it would be manipulating the actual attack and release time parameters, and the user may experience the audio enhancement exactly according to his or her preferences.

A given spoken letter, phoneme, or linguistic element has a unique frequency signature, typically containing a unique combination of the fundamental frequency (the most prominent contributor) as well as overtones and other less prominent frequency contributions. The general user typically does not know the correlation between the spoken letter, phoneme, or linguistic element and its associated frequency signature. A given word, for example, is typically comprised of a series of phonemes strung together. When a user hears a word, he or she is hearing the strung-together combination of these various frequency signatures. If the user experiences discomfort when hearing the phoneme "t" in the word "punctilious", for example, he or she may interactively identify it as the source of discomfort and this would correlate to the frequency parameter associated with the frequency signature for "t" (typically the fundamental frequency).

Figure 2:
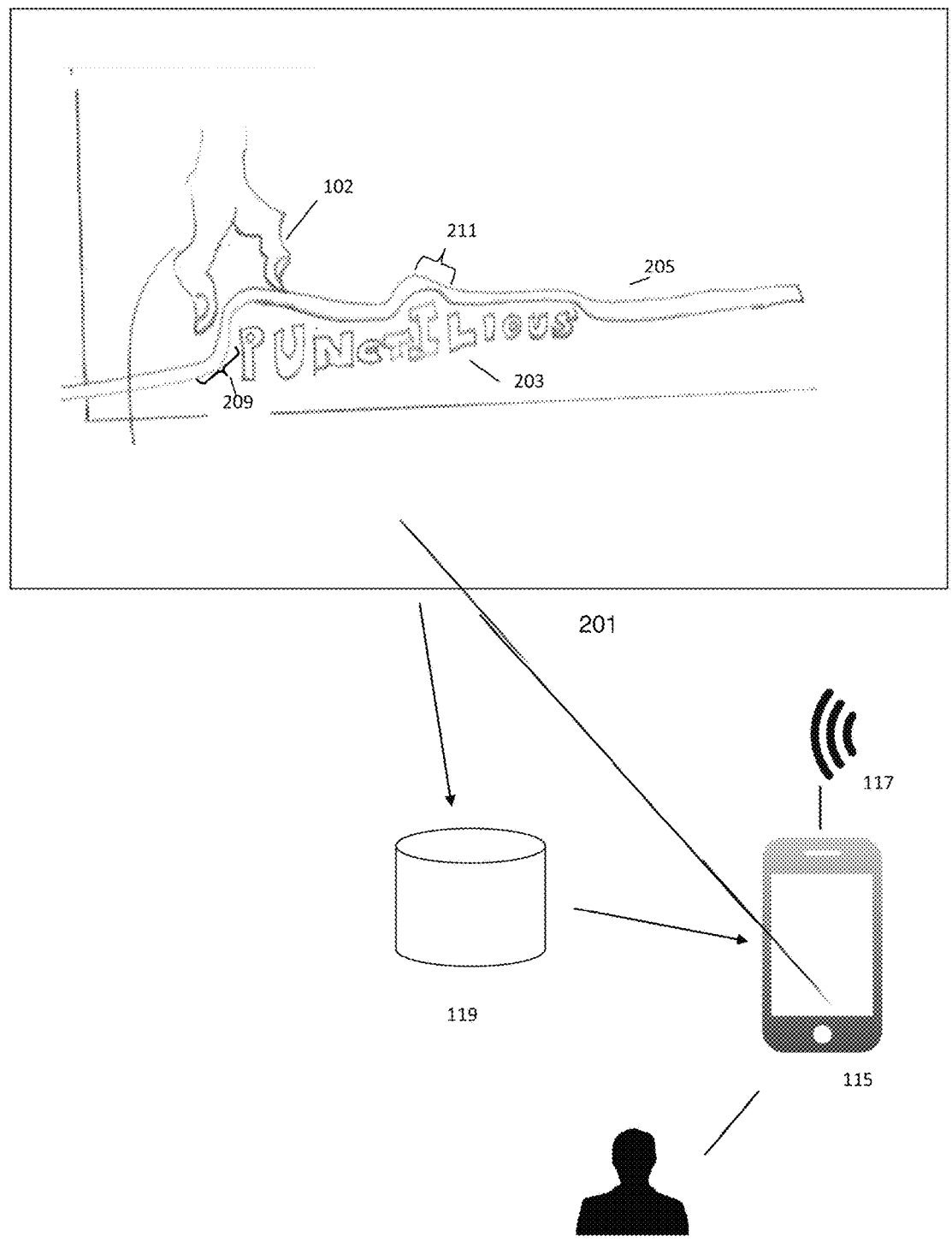
FIG. 2 shows another embodiment of an interactive graphical user interface wherein the user is presented with a user adjustable displayed word and a user adjustable graphical curve.

For example, as illustrated in FIG. 2, a further illustrative embodiment is an interactive graphical user interface 201 wherein the user 121 is presented with a user adjustable displayed word 203 and a user adjustable graphical curve 205, and where changes made by the user with the user's fingers 102 to the graphical curve 205 are mapped to changes in attack and release time in the signal processing parameters 119 utilized to process speech or other sound presented to the user. As the user 121 adjusts an upward slope 209 over a particular letter or segment of a word to be more steep, or pinched, as is illustrated in FIG. 2, these changes may map to a shortening of the attack time (for the given frequency or frequency band associated with the sound of that particular letter or word segment) in the signal processing parameters 119 utilized to process speech or other sound presented to the user. In turn, a shortening of the attack time for a given letter or word segment will result in a reduction of the height of the letter or word segment on the visual interface, thus providing visual feedback to the user. If the selected letter or word segment happened to be causing discomfort to the user, he or she may iterate through the process of manipulating the curve over the selected letter or word segment in his or her attempt to eliminate discomfort while simultaneously retaining good or adequate speech discrimination. Similarly, any adjustments the user 121 may make to a downward slope 211 of a letter or segment of the word may map to the corresponding shortening or lengthening of the release time in the signal processing parameters. The user may adjust the shape of the curve over the letters while listening to spoken language 117 on device 115, which spoken language 117 may be "looped" or repeated if being presented to the user over device 115 as a recording, and through trial and error, in an iterative process, discover shapes that reduce or eliminate discomfort for certain frequencies, letters or linguistic elements while retaining good or adequate speech discrimination. (The method by which a particular word on a recording identified by the user as problematic is transformed into graphical text data on the user interface is not the subject of this specification, but may include any known speech recognition and caption-generating processes or algorithms. Once caption data is generated, a further known process for turning text data into visual/graphical data that can be manipulated via the GUI may be employed.) In a further, alternative embodiment, the interactive graphical user interface 201 may also allow the user to adjust the gain (boost in volume) of a particular sound by pulling up on the adjustable curve above that sound in the word, thereby enlarging the size of the letter. To the user 121, this will graphically appear to make the affected letter larger. Such a change may be mapped to the increase in volume in the frequency that corresponds to the letter the user adjusted in the signal processing parameters 119 utilized to process speech or other sound presented to the user. The user may adjust the shape of the curve over the letters while listening to spoken language 117 on device 115, which spoken language 117 may be "looped" or repeated if being presented to the user over device 115 as a recording, and through trial and error, in an iterative process, discover sizes that increase understanding of, or enhance the ability to hear, certain phonemes, letters, linguistic elements or frequencies that may have been difficult for the user to understand or hear. Such an embodiment would provide an alternative interface for the user to be able to employ equalization to improve sound without the user having to know anything about the parameters associated with equalization. That is, the underlying technical aspects, components algorithms and parameters associated with equalization would be completely hidden from the user's perspective.

Figure 6:
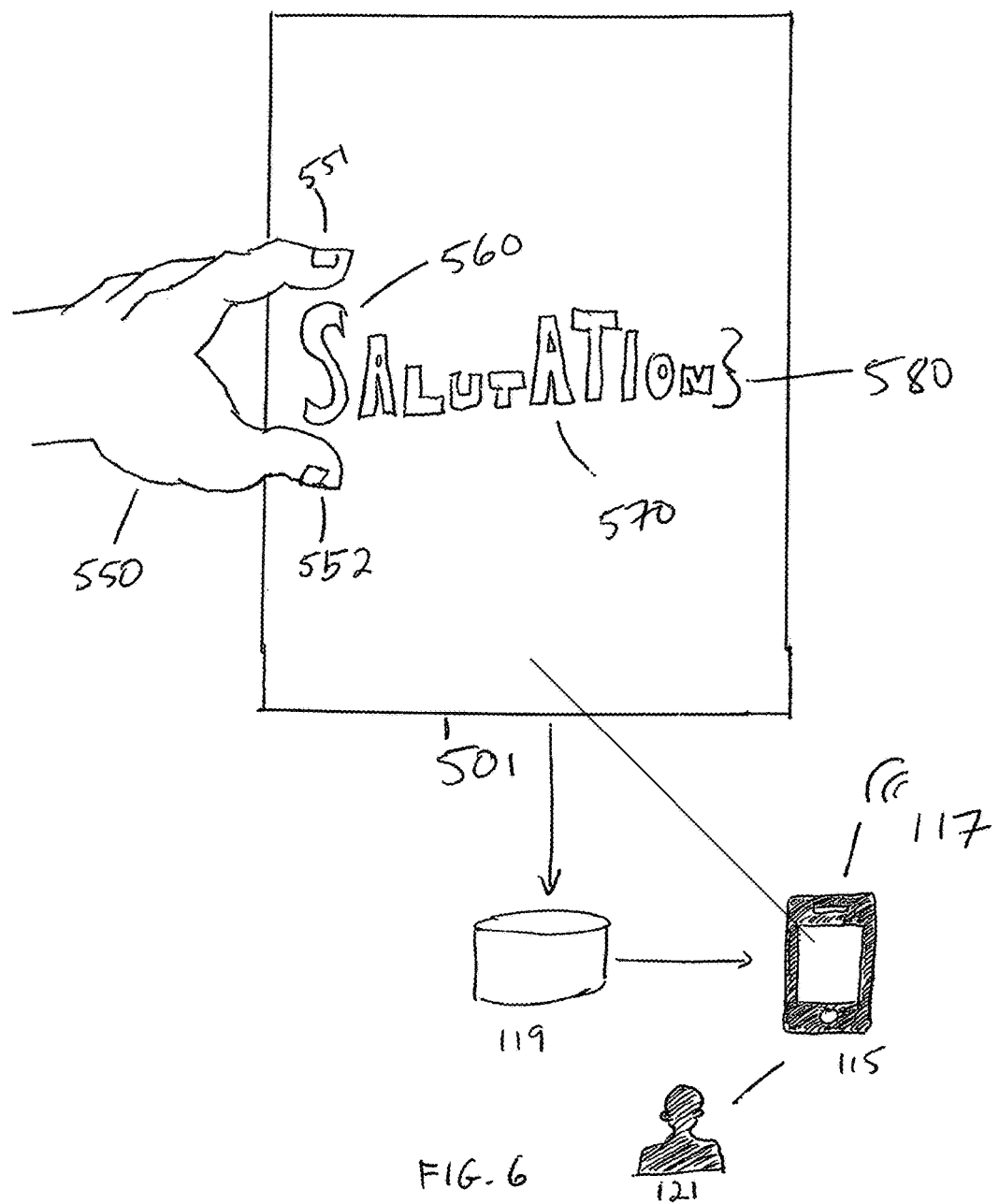
FIG. 6 illustrates another embodiment of the invention including an interactive graphical user interface that allows a user to adjust the gain (boost in volume) of a particular sound by using fingers and/or thumb in an expanding or pinching gesture.

In a further embodiment, as illustrated in FIG. 6, the interactive graphical user interface 501 may also allow the user to adjust the gain (boost in volume) of a particular sound by using fingers and/or thumb 551 and 552 in an expanding or pinching gesture to directly enlarge or reduce the size or height of the letters, phonemes, linguistic elements, word segments or words 570. To the user 121, this will graphically appear to make the affected letter, phoneme, linguistic element, word segment or word larger. Such a change may be mapped to the increase in volume in the frequency or frequency band that corresponds to the letter, phoneme, linguistic element, word segment or word the user adjusted in the signal processing parameters 119 utilized to process speech or other sound presented to the user. The user may adjust the size or height of the letter(s), phoneme(s), linguistic element(s), word segment(s) or word(s) while listening to spoken language 117 on device 115, which spoken language 117 may be "looped" or repeated if being presented to the user over device 115 as a recording, and through trial and error, in an iterative process, trying different words, phases, sentences and listening carefully for potential deficiencies in the user's hearing associated with certain words, phrases or sentences, the user may discover said sizes or heights that increase understanding of, or enhance the ability to hear, certain phonemes, letters, linguistic elements, word segments, words, or frequencies that may have been difficult for the user to understand or hear. Such an embodiment would provide an alternative interface for the user to be able to employ equalization to improve sound without the user having to know anything about the parameters associated with equalization. That is, the underlying technical aspects, components algorithms and parameters associated with equalization would be completely hidden from the user's perspective.

It should be appreciated that the illustrative embodiments in FIG. 2 and FIG. 6 are merely for illustration and are not intended to limit the application of these functions. Of course, other methods of representing the equalization algorithm may be employed without departing from the various described embodiments.

It should also be appreciated that the illustrative embodiment in FIG. 2 is merely for illustration and are not intended to limit the application of this functions. Of course, other methods of representing the attack and release time algorithm(s) may be employed without departing from the various described embodiments.

Figure 3:
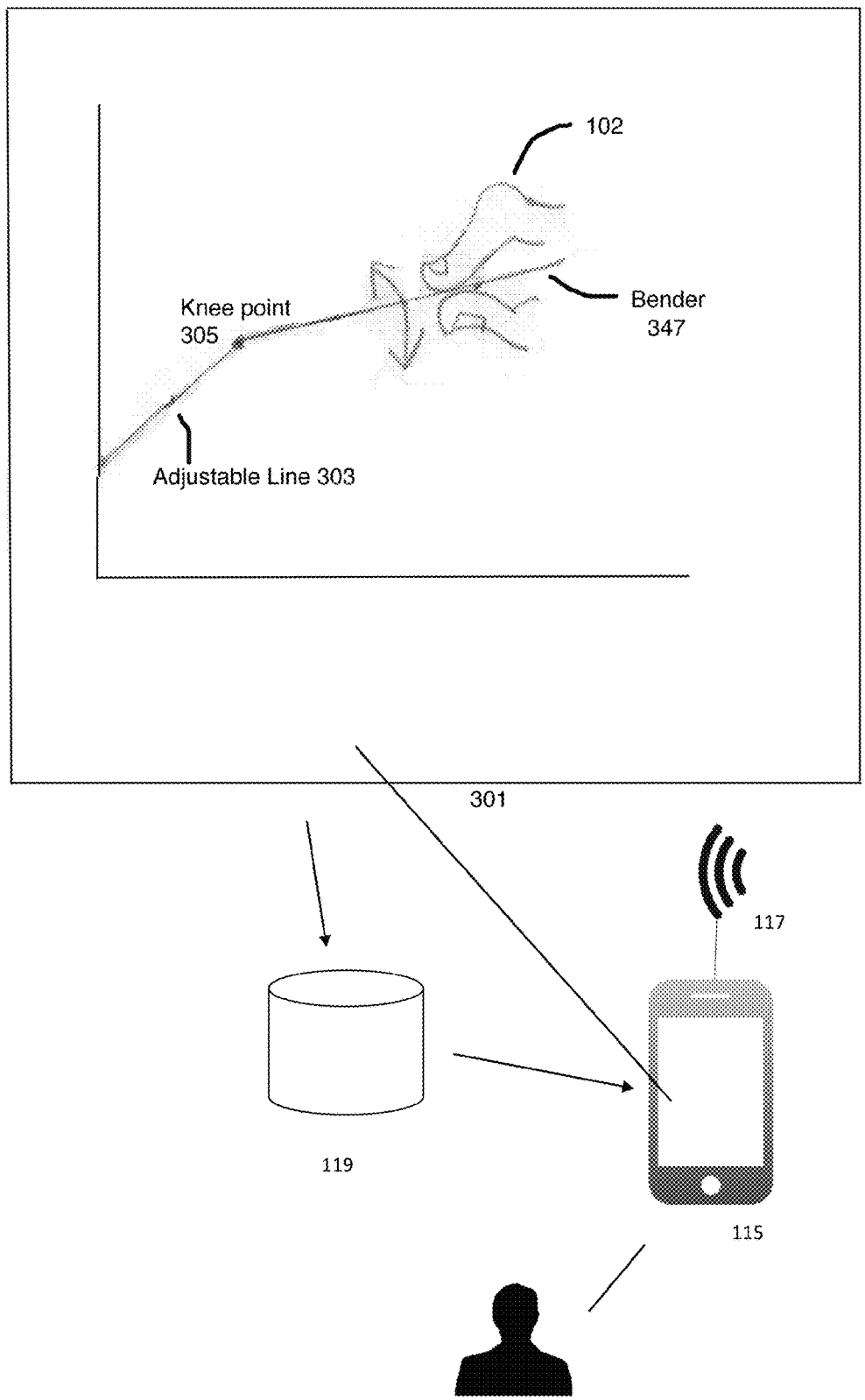
FIG. 3 provides further illustrative embodiment of an interactive graphical user interface wherein the user is presented with a user adjustable line, for each frequency band, that can be bent at various knee points.

Those skilled in the art of audiology generally use compression as one of several tools in speech processing to help an individual hear better while still ensuring the user does not feel pain associated with an amplification or gain that is too loud for the individual. As illustrated in FIG. 3, a further illustrative embodiment comprises an interactive graphical user interface 301 wherein the user 121 is presented with a user adjustable line 303, for each frequency band, that can be bent at various knee points 305. Alternatively, though not illustrated, the adjustable line 303 might, instead of being associated with a particular frequency or frequency band, be associated with a particular letter or class of linguistic elements, such as vowels, consonants, sibilants, plosives, fricatives. The user 121, while listening to spoken language or sound 117 on their device 115 may place a knee point 305 at any given point along the adjustable line 303. The knee point, an x-y position on the graph containing adjustable line 303, would correspond to the "threshold" parameter used in wide dynamic range compression and basic compression to identify the output volume level at which compression or limiting should "kick in" in order to prevent incoming sounds from being boosted too loudly for the user. A basic compressor or limiter charts output volume along the y-axis as a function of input volume along the x-axis. The portion of the line 303 beyond (to the right of) the knee point will be defined here as the "bender" 347. The user may also be able to "bend" the bender 347 and make its slope shallower or steeper. A shallower slope would correspond to a higher "ratio" parameter and a steeper slope would correspond to a lower ratio parameter. The ratio parameter in wide dynamic range compression refers to the degree of severity with which limiting or compression is applied to restrict the volume of sounds louder than the threshold setting. The knee point 305 as well as the slope of the bender 347 may both be mapped to a compression setting in the signal processing parameters 119 utilized to process speech or other sound presented to the user, such that when the user makes the adjustment, the compression response at that frequency is changed. (In the case of compression, the knee point maps to the output volume threshold where compression should begin, and the bender affects how aggressive the compression should be beyond that threshold. Therefore, this method may provide an appropriate way to modulate comfort (pain level) for a user at a given frequency.) The user may then play the spoken language or other sound 117, and through trial and error, place the knee point 305 at a position along the line 303, and adjust the bender 347 by simply "bending" it, thus providing the user with a comfortable degree of compression for that frequency. The user may be presented with multiple versions of adjustable graphic user interface 301 for each of the various frequencies, or, alternatively, for each of the various letters or linguistic elements.

Figure 4:
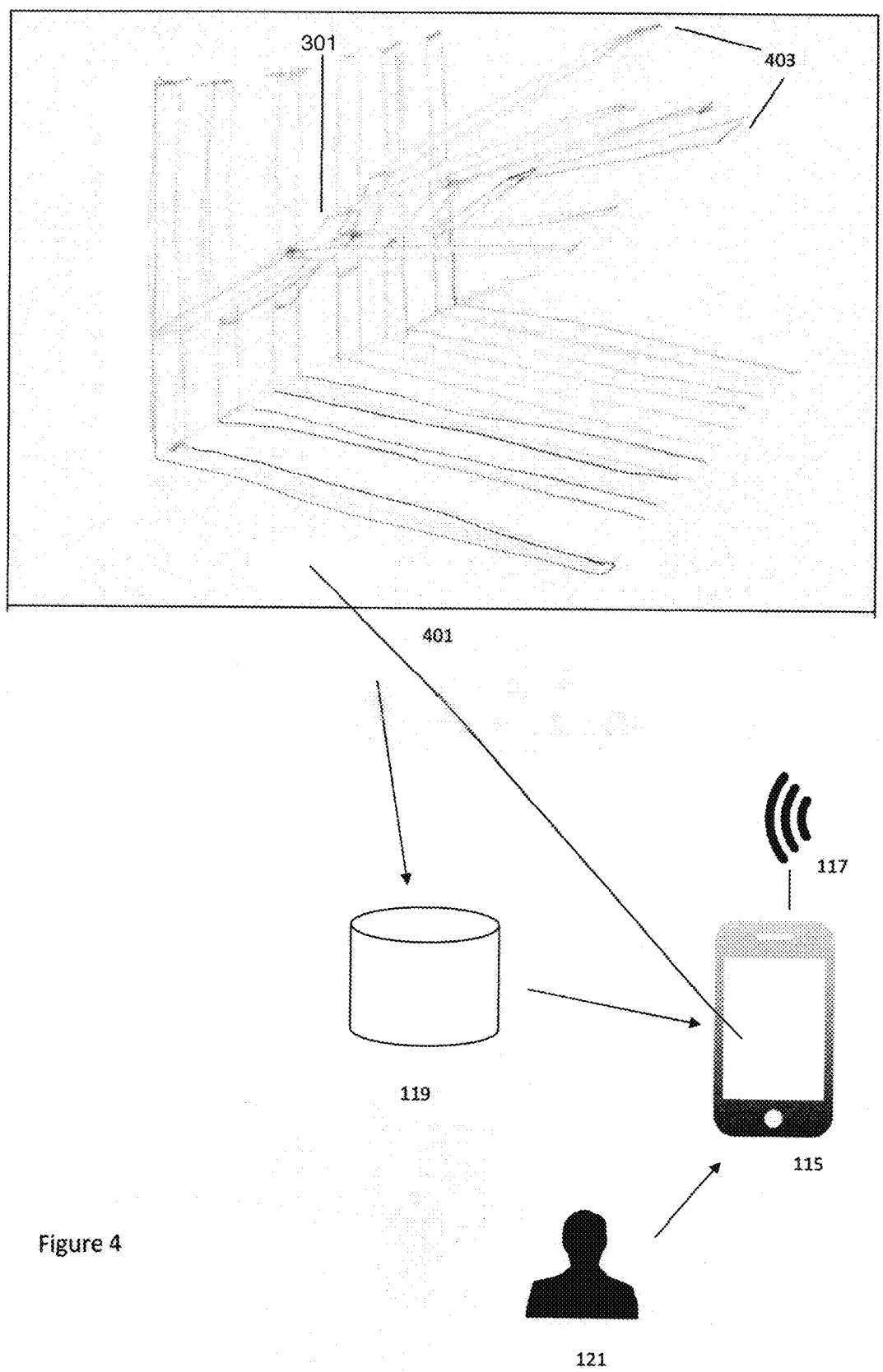
FIG. 4 illustrates an interactive graphical user interface that is 3-dimensional and wherein a user may changes parameters in each of the three dimensions.

In a further embodiment, the user 121 may also or alternatively be presented with an interactive graphic user interface 401, which may be a 3-dimensional figure, as illustrated in FIG. 4, that may represent slices of the various frequencies 403 of sound, or alternatively, letters, or linguistic elements, with the corresponding knee points 301 at each of those frequencies (or letters or linguistic elements) 403, and the corresponding adjustable bender at each frequency (or letter or linguistic element) 403. The user may then interactively slide his finger along the "z-axis" dimension (the virtual dimension going "into" the screen) and subsequently adjust the compression levels at any given frequency (or letter or linguistic element), or alternatively "page" through the frequencies (or letters or linguistic elements) and adjust the compression variables (knee point position and bender) as they appear as the current "page." It is understood that the process may be one of trial and error during which time some form of audio 117, including but not limited to recorded audio, may be presented to the user, so that the user may receive aural feedback on the adjustments the user is making, as previously discussed, in order to fine tune the audio according to the user's preferences.

It should be appreciated that the illustrative embodiment in FIG. 4 is merely for illustration and is not intended to limit the application of this function. Of course, other methods of representing the compression algorithm may be employed without departing from the various described embodiments. It is further understood that a smartphone 115 in FIGS. 1,2,3,4,6 is purely exemplary, and that other sound emitting devices used for the purpose of communication and/or media enjoyment may be used.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, and optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above for panoramas may be applied to images that have been captured as non-panoramic images, and vice versa.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

What is claimed is:

1. A method for controlling a plurality of signal processing parameters with a device having a graphical user interface that is associated with a signal processor for processing audio signals, comprising:
   for each of a plurality of words contained within a first audio signal, each word comprising at least one phoneme, the device associating a respective frequency with each of the at least one phoneme;
   displaying at least one selected word from the plurality of words contained within the audio signal on the graphical user interface;
   displaying a curve that is one of adjacent to and above the selected word on the graphical user interface, wherein the curve exhibits a curvature as a function of a position parameter;
   receiving an input on the graphical user interface, the input indicating a position on the curve and a desired curvature of the curve at the position;
   redisplaying the curve on the graphical user interface to indicate the desired curvature;
   determining at least one of an attack time parameter and a release time parameter based upon the desired curvature;
   providing the at least one of an attack time parameter and release time parameter to the signal processor; and
   in response to the desired curvature of the curve input by a user, modifying the at least one of the attack time parameter and the release time parameter for a frequency band associated with a sound of the displayed word to enable a user to hear the displayed word.

2. The method according to claim 1, wherein at least one slope parameter is determined from the curvature and the at least one of an attack time parameter and release time parameter is determined from the at least one slope parameter.

3. The method according to claim 1, including repeating the spoken language for the displayed word so further adjustments to the curve are provided in an iterative process, to discover a shape for the curve that reduces or eliminates discomfort for certain frequencies, letters or linguistic elements, while retaining adequate speech discrimination.

4. The method according to claim 1, including pulling the curve upward or downward to adjust gain in volume of a particular sound, thereby enlarging or reducing a size of the letter or letters below the curve corresponding to the particular sound.

5. The method according to claim 1, wherein the signal processor processes audio signals that are output by a sound emitting device.

6. The method according to claim 1, wherein the step of displaying of the curve that is one of adjacent to and above the selected word on the graphical user interface includes displaying the curve above the selected word on the graphical user interface.

7. A method for controlling a plurality of signal processing parameters with a device having a graphical user interface that is associated with a signal processor for processing audio signals, comprising:
   for each of a plurality of words within a first audio signal, each word comprising at least one phoneme, the device associating a respective frequency with each of the at least one phoneme;
   displaying a coordinate system graph associated with a selected phoneme on the graphical user interface, wherein the input volume of said phoneme is measured along the x-axis of said graph and the output volume is measured along the y-axis of said graph;
   displaying a curve on said graph on the graphical user interface, wherein for each of a plurality of points on said curve the x-position of a point on the graph represents the input volume of the phoneme and the y position of the same point on the graph represents the output volume of said phoneme;
   receiving an input on the graphical user interface, said input indicating a desired y-position of a point on the curve associated with a desired output volume, wherein said output volume is the threshold output volume beyond which compression or limiting is applied to the input signal;
   redisplaying the curve on the graphical user interface to indicate the desired kneepoint, that is, the x-y point associated with said desired threshold output volume y-position;
   determining at least one of a threshold parameter and a kneepoint parameter with the device based upon the desired y-position; and
   providing the at least one of a threshold parameter and a kneepoint parameter to the signal processor,
   wherein the providing of the at least one of a threshold parameter and a kneepoint parameter to the signal processor enables a user to hear the phonemes and words.

8. The method according to claim 7, including displaying at least one selected word on the graphical user interface.

9. The method according to claim 7, wherein the signal processor processes audio signals that are output by a sound emitting device, and wherein the device having the graphical user interface is from a group consisting of: a cellphone and computer tablet.

10. The method according to claim 7, including repeating the spoken language for the word so further adjustments to the curve are provided in an iterative process, to discover a shape for the curve that reduces or eliminates discomfort for certain frequencies, letters or linguistic elements, while retaining adequate speech discrimination.

11. A method for controlling a plurality of signal processing parameters with a device having a graphical user interface that is associated with a signal processor for processing audio signals, comprising:
   for each of a plurality of words within a first audio signal, each word comprising at least one of a phoneme and letter, the device associating a respective frequency with each of the at least one of the phoneme and letter;
   displaying a selected word on the graphical user interface wherein the individual at least one of phoneme and letter comprising said word exhibits one of a size and height that is a function of an input parameter;
   receiving an input on the graphical user interface, said input indicating a desired one of size and height of the at least one of phoneme and letter;
   redisplaying the word on the graphical user interface to indicate the desired one of size and height of the at least one of phoneme and letter in the word;

determining an equalization gain parameter based upon the desired one of size and height of the at least one of phoneme and letter; and providing the equalization gain parameter to the signal processor, wherein the adjusting of the size and height of the at least one of phoneme and letter enables a user to hear the phonemes and words.

12. The method according to claim 11, wherein the signal processor processes audio signals that are output by a sound emitting device, and wherein the device having the graphical user interface is from a group consisting of: a cellphone and computer tablet.

13. The method according to claim 11, including repeating the spoken language for the displayed word so further adjustments to the one of size and height of the at least one of phoneme and letter are provided in an iterative process, to discover the size and the height of the at least one of phoneme and letter that provides adequate speech discrimination.

\* \* \* \* \*